Patented Nov. 6, 1923.

1,473,285

UNITED STATES PATENT OFFICE.

HARRY L. FISHER, OF AKRON, OHIO, ASSIGNOR TO THE B. F. GOODRICH COMPANY, OF NEW YORK, N. Y., A CORPORATION OF NEW YORK.

RUBBER COMPOSITION AND METHOD OF MAKING THE SAME.

No Drawing.   Application filed May 16, 1922.   Serial No. 561,537.

*To all whom it may concern:*

Be it known that I, HARRY L. FISHER, a citizen of the United States, residing at Akron, in the county of Summit and State of Ohio, have invented certain new and useful Rubber Compositions and Methods of Making the Same, of which the following is a specification.

My invention comprises the use of certain organic nitrogenous compounds which function as accelerators for the vulcanization of rubber by sulfur and are described in detail in the following specification.

Ammonia furnishes a cheap and convenient source of nitrogen for the manufacture of organic accelerators. The most important accelerators which have previously been derived from ammonia, are hexamethylene tetramine and aldehyde ammonia, formed by the action of ammonia on aldehydes. Hexamethylene tetramine, however, does not melt into or flux with the rubber and it affects the workmen by causing dermatitis. Aldehyde ammonia is unstable, variable in curing power and develops foul odors in rubber stocks. I have found that these disadvantages may be avoided and that a wide range of curing power is made available by using as accelerators the reaction products of aliphatic-ketones with ammonia or the aliphatic amines derived therefrom.

By the action of ammonia on acetone at high temperatures (100° C.) or at ordinary temperature after long standing there is formed a mixture of acetone amines such as diacetone amine, triacetone diamine, triacetone amine and other products. The use of dehydrating agents such as calcium chloride greatly facilitates the reaction and also gives a product of greater value as an accelerator. The same or similar products may be obtained by the action of dehydrating agents such as dry hydrochloric acid gas on ketones to form mesityl oxide and phorone or their homologues, which products react with ammonia to give the various ketone amines.

I have found these acetone amines to be valuable accelerators in rubber mixes and also find that other ketones such as methylethyl ketone may be used in place of acetone. Acetone is preferable, on account of its lower cost. The use of substituted ammonias (amines) for reaction with ketones does not, as a rule, give the best accelerators, since alkylated ammonias, such as methyl or ethyl amines, give corresponding alkylated acetone amines which are comparatively unstable and easily decompose into the free amine and mesityl oxide or phorone. Such instability makes the product of comparatively low value as an accelerator. There are, however, other amines, such as hydroxylamine, which give stable acetone amines and come within the scope of my claims.

Triacetone amine, whose structural formula is here given,

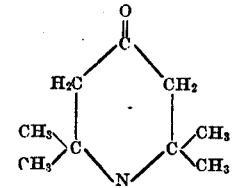

may be purified and identified through its oxalate. It is characterized as an accelerator as follows:

*Example No. 1.*

|  | Parts. |
|---|---|
| Rubber | 100 |
| Zinc oxide | 3 |
| Sulfur | 5 |
| Accelerator | 1.55 |

This mixture gives a tensile of approximately 3000 lbs. per sq. inch, with an elongation of 790% at break when vulcanized for 90 minutes at 286° F. The cured rubber has a high modulus of elasticity and a fine grain, showing high resistance to tear.

Diacetone amine, whose structural formula is here shown,

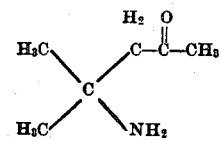

is characterized as an accelerator by the following:

*Example No. 2.*

|  | Parts. |
|---|---|
| Rubber | 100 |
| Zinc oxide | 3 |
| Sulfur | 5 |
| Accelerator | 1.73 |

When vulcanized for 20 minutes at 287° F. this mix gives a tensile strength of 2300 lbs. per sq. in. and an elongation of 830% at break. In 30 minutes the tensile reaches 2900 lbs. and in 90 minutes, 3200 lbs.

My preferred method for the commercial preparation of these accelerators includes the use of powdered calcium chloride suspended in acetone during the saturation of the latter with ammonia gas. The mix is then allowed to stand at ordinary temperature with occasional or slow agitation for the completion of the reaction. The supernatant oily layer is then removed from the aqueous calcium chloride layer and the excess of acetone and ammonia removed by distillation.

I find, moreover, that if the above crude mixture of acetone amines be distilled at atmospheric pressure and at high temperatures both the distillate and the residue show accelerating power. The distillate is a thin liquid of comparatively low curing power, while the residue is a thick liquid or soft resin, depending on the amount of distillate removed, and shows higher curing power with less variation than many of the original amines or distillates. For this reason my preferred procedure is to distill the crude mixture of acetone amines, acetone and free ammonia until a temperature of 275° C. is reached with the thermometer in the liquid. The distillation is then interrupted, the residue cooled and compounded with rubber, sulfur, etc., in the usual manner. I do not, however, limit myself to a definite temperature since the residues at 100° C., 150° C., 250° C. and 300° C. all show good curing power and are valuable as furnishing varying degrees of acceleration for commercial purposes.

These distillation residues of the crude acetone amine liquors are characterized by the following compounding data:

*Example No. 3.*

|  | Parts. |
|---|---|
| Rubber | 100 |
| Zinc oxide | 3 |
| Sulfur | 5 |
| Accelerator | 1.73 |

*Tensiles and elongations.*

| Cures at 286° F. | Residue at 100° C. | | Residue at 275° C. | |
|---|---|---|---|---|
| | Tensile, lbs. per sq. in. | Percentage elongation. | Tensile, lbs. per sq. in. | Percentage elongation. |
| 15 min | 1,385 | 920 | 3,420 | 855 |
| 30 min | 2,650 | 880 | 4,000 | 775 |
| 60 min | 3,230 | 810 | 3,300 | 705 |
| 90 min | 2,583 | 855 | 2,850 | 810 |

I also find that the crude acetone amine liquors, the distillation products, or the residues may be treated with carbon dioxide, carbon disulfide, or aldehydes to produce new and valuable accelerators. Further, by treating them with hydrogen sulfide at ordinary temperatures and removing the excess of solvent or heat decomposition products, as by distillation at 100° C., there is produced a higher yield of residue having valuable characteristics as an accelerator. This residue is a very thick reddish liquid or thin resin when so prepared and may be hardened by further heat.

This reaction product of the crude acetone amine liquors with hydrogen sulfide, heated for twelve hours on a steam bath, is characterized as an accelerator by the following compounding data:

*Example No. 4.*

|  | Parts. |
|---|---|
| Rubber | 100 |
| ZnO | 3 |
| Sulfur | 5 |
| Accelerator | 1.73 |

When vulcanized at 286° F. for 30 minutes there is developed a tensile of 2900 lbs. per sq. in. at an elongation of 825%. At 60 minutes the corresponding tests show 3725 lbs. at 815% elongation.

The accelerating action of these ketone amines and their derivatives is shown by the above examples, since without the accelerator, the same mix will not vulcanize properly in less than 180 to 220 minutes, with resultant inferior physical tests, as is well known.

Further, I have found that acetone, either with or without a dehydrating agent, may be variously treated with ammonia in the presence of—

(1) Hydrogen sulfide (ammonium sulfide), (2) $H_2S$ and sulfur (ammonium polysulfide), (3) Carbon bisulfide (ammonium dithiocarbamate), (4) $H_2S$ and $CS_2$ (ammonium trithiocarbonate), (5) Mercaptans in place of $H_2S$ in 1, 2 or 4, the reactions taking place at ordinary or slightly elevated temperatures. Any combination of these re-agents may be used. The resulting products may be used direct as accelerators or may be first hardened by partial distillation.

It is also obvious that the several compounds heretofore suggested, or similar compounds, may be prepared by treating acetone or other ketones with concentrated hydrochloric acid, its dry gas, or other dehydrating agents, to produce compounds of the type of mesityl oxide, phorone. etc., and that these products may then be reacted upon with ammonia, or with ammonia and one of the substances or combinations numbered 1 to 5 above, or first with ammonia and the resulting product then treated with one of said substances or combinations numbered 1 to 5.

By the reaction of aldehydes such as acetaldehyde on acetone amine there is produced vinyl diacetone amine which is similar to triacetone amine but with one less methyl group.

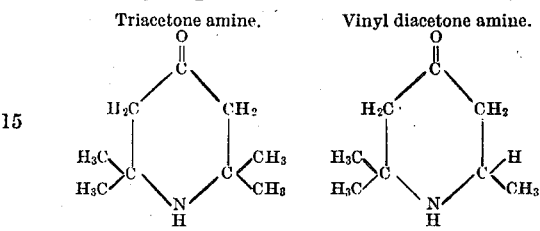

Triacetone amine.     Vinyl diacetone amine.

Both of these compounds are good accelerators. By reduction or dehydration or both, they give alkamines and unsaturated acetonines which are also valuable accelerators. By condensation with hydrogen sulfide or mercaptans they give mercaptals and other sulfur derivatives which are new and valuable accelerators.

The following list of accelerators, comprising acetone amines and substances derived from the acetone amines, directly or indirectly, all of which have been described in the organic chemical literature, will characterize, in brief and in part, the new class of compounds which I claim as accelerators for the vulcanization of rubber by sulfur. The chemical compositions of many of their derivatives by the action of $H_2S$, $CS_2$, aldehydes, etc., are still unknown, but their methods of preparation will be understood by those skilled in the art, and such derivatives are valuable as accelerators.

(a) Diacetone amine.
(b) Triacetone amine.
(c) Triacetone diamine.
(d) Diacetone amine anhydride.
(e) Vinyl diacetone amine.
(f) Trimethyl piperidine diethyl mercaptol.
(g) Ethyl triacetonin sulphide.
(h) Acetonin.
(i) Thiacetonin.
(j) Carbo thiacetonin.
(k) Dihydro triacetone amine.
(l) Triacetone alkamine.
(m) Triacetonin.

There are many other ways of preparing these or similar compounds such as starting with the various thio ketones or thio aldehydes. By whatever method they may be prepared I wish to cover the same as broadly as possible in view of the prior art and as described in the following claims.

I claim:

1. A process of vulcanizing rubber which comprises vulcanizing the rubber in the presence of sulfur and a reaction product of ammonia or an aliphatic amine with an aliphatic ketone.

2. A process of vulcanizing rubber which comprises vulcanizing the rubber in the presence of sulfur and a reaction product of ammonia with an aliphatic ketone.

3. A process of vulcanizing rubber which comprises vulcanizing the rubber in the presence of sulfur and a reaction product of ammonia or an aliphatic amine with acetone.

4. A process of vulcanizing rubber which comprises vulcanizing the rubber in the presence of sulfur and a reaction product of ammonia with acetone.

5. A process of vulcanizing rubber which comprises vulcanizing the rubber in the presence of sulfur and a reaction product of ammonia or an aliphatic amine with an aliphatic ketone, prepared in the presence of a dehydrating agent.

6. A process of vulcanizing rubber which comprises vulcanizing the rubber in the presence of sulfur and a reaction product of ammonia with an aliphatic ketone prepared in the presence of a dehydrating agent.

7. A process of vulcanizing rubber which comprises vulcanizing the rubber in the presence of sulfur and a reaction product of ammonia or an aliphatic amine with acetone, prepared in the presence of a dehydrating agent.

8. A process of vulcanizing rubber which comprises vulcanizing the rubber in the presence of sulfur and a reaction product of ammonia with acetone prepared in the presence of a dehydrating agent.

9. A process of vulcanizing rubber which comprises vulcanizing the rubber in the presence of sulfur and a reaction product of ammonia or an aliphatic amine with an aliphatic ketone, prepared in the presence of calcium chloride.

10. A process of vulcanizing rubber which comprises vulcanizing the rubber in the presence of sulfur and a reaction product of ammonia with an aliphatic ketone prepared in the presence of calcium chloride.

11. A process of vulcanizing rubber which comprises vulcanizing the rubber in the presence of sulfur and a reaction product of ammonia or an aliphatic amine with acetone, prepared in the presence of calcium chloride.

12. A process of vulcanizing rubber which comprises vulcanizing the rubber in the presence of sulfur and a reaction product of ammonia with acetone prepared in the presence of calcium chloride.

13. A process of vulcanizing rubber which comprises vulcanizing the rubber in the presence of sulfur and a reaction product of ammonia or an aliphatic amine, an aliphatic ketone, a dehydrating agent, and one of the reactive compounds of sulfur numbered 1 to 5 in the above specification.

14. A process of vulcanizing rubber which comprises vulcanizing the rubber in the presence of sulfur and a reaction product of ammonia or an aliphatic amine, an aliphatic ketone, and one of the reactive compounds of sulfur numbered 1 to 5 in the above specification.

15. A process of vulcanizing rubber which comprises vulcanizing the rubber in the presence of sulfur and a reaction product of ammonia, acetone and one of the reactive compounds of sulfur numbered 1 to 5 in the above specification.

16. A process of vulcanizing rubber which comprises vulcanizing the rubber in the presence of sulfur and a reaction product of ammonia, acetone and hydrogen sulfide.

17. A process of vulcanizing rubber which comprises vulcanizing the rubber in the presence of sulfur and a derivative of a ketone amine.

18. A process of vulcanizing rubber which comprises vulcanizing the rubber in the presence of sulfur and a derivative of an acetone amine.

19. A process of vulcanizing rubber which comprises vulcanizing the rubber in the presence of sulfur and the heat distillation residue of a ketone amine.

20. A process of vulcanizing rubber which comprises vulcanizing the rubber in the presence of sulfur and the heat distillation residue of an acetone amine.

21. A process of vulcanizing rubber which comprises vulcanizing the rubber in the presence of sulfur and the heat distillation residue of the reaction product of acetone with ammonia.

22. A process of vulcanizing rubber which comprises vulcanizing the rubber in the presence of sulfur and the heat distillation residue at approximately 275° C. of the reaction product of acetone with ammonia.

23. A process of vulcanizing rubber which comprises vulcanizing the rubber in the presence of sulfur and one of the accelerators lettered from (a) to (m) in the above specification.

24. A process of vulcanizing rubber which comprises vulcanizing the rubber in the presence of sulfur and diacetone amine.

25. As a new composition of matter, a vulcanized rubber containing vulcanization products of (1) sulfur and (2) a reaction product of ammonia or an aliphatic amine with an aliphatic ketone.

26. As a new composition of matter, a vulcanized rubber containing vulcanization products of (1) sulfur and (2) a reaction product of ammonia with an aliphatic ketone.

27. As a new composition of matter, a vulcanized rubber containing vulcanization products of (1) sulfur and (2) a reaction product of ammonia or an aliphatic amine with acetone.

28. As a new composition of matter, a vulcanized rubber containing vulcanization products of (1) sulfur and (2) a reaction product of ammonia with acetone.

29. As a new composition of matter, a vulcanized rubber containing vulcanization products of (1) sulfur and (2) a reaction product of ammonia or an aliphatic amine with an aliphatic ketone, prepared in the presence of a dehydrating agent.

30. As a new composition of matter, a vulcanized rubber containing vulcanization products of (1) sulfur and (2) a reaction product of ammonia with acetone in the presence of calcium chloride.

31. As a new composition of matter, a vulcanized rubber containing vulcanization products of (1) sulfur and (2) a reaction product of ammonia or an aliphatic amine, an aliphatic keytone, a dehydrating agent, and one of the reactive compounds of sulfur numbered 1 to 5 in the above specification.

32. As a new composition of matter, a vulcanized rubber containing vulcanization products of (1) sulfur and (2) a reaction product of ammonia or an aliphatic amine, an aliphatic ketone, and one of the reactive compounds of sulfur numbered 1 to 5 in the above specification.

33. As a new composition of matter, a vulcanized rubber containing vulcanization products of (1) sulfur and (2) a reaction product of ammonia, an aliphatic ketone, and one of the reactive compounds of sulfur numbered 1 to 5 in the above specification.

34. As a new composition of matter, a vulcanized rubber containing vulcanization products of (1) sulfur and (2) a reaction product of ammonia, acetone and hydrogen sulfide.

35. As a new composition of matter, a vulcanized rubber containing vulcanization products of (1) sulfur and (2) a derivative of a ketone amine.

36. As a new composition of matter, a vulcanized rubber containing vulcanization products of (1) sulfur and (2) a derivative of an acetone amine.

37. As a new composition of matter, a vulcanized rubber containing vulcanization products of (1) sulfur and (2) the heat distillation residue of a ketone amine.

38. As a new composition of matter, a vulcanized rubber containing vulcanization products of (1) sulfur and (2) the heat distillation residue of an acetone amine.

39. As a new composition of matter, a vulcanized rubber containing vulcanization products of (1) sulfur and (2) the heat distillation residue of the reaction product of acetone with ammonia.

40. As a new composition of matter, a vulcanized rubber containing vulcanization products of (1) sulfur and (2) the heat distillation residue, at approximately 275° C. of the reaction product of acetone with ammonia.

41. As a new composition of matter, a vulcanized rubber containing vulcanization products of (1) sulfur and (2) one of the substances lettered from (a) to (m) in the above specification.

42. As a new composition of matter, a vulcanized rubber containing vulcanization products of (1) sulfur and (2) diacetone amine.

In witness whereof I have hereunto set my hand this 13th day of May, 1922.

HARRY L. FISHER.